United States Patent
Kang et al.

(10) Patent No.: US 12,397,679 B2
(45) Date of Patent: Aug. 26, 2025

(54) OPTIMAL CONTROL STRATEGY FOR A DISTRIBUTED LOW VOLTAGE SYSTEM WITH BIDIRECTIONAL DIRECT CURRENT CONVERTERS

(71) Applicant: GM GLOBAL TECHNOLOGY OPERATIONS LLC, Detroit, MI (US)

(72) Inventors: Jun-mo Kang, Ann Arbor, MI (US); Muhammad Hussain Alvi, Troy, MI (US); Mohamed Ahmed Kamel Ahmed, Birmingham, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 302 days.

(21) Appl. No.: 18/169,322

(22) Filed: Feb. 15, 2023

(65) Prior Publication Data
US 2024/0270120 A1     Aug. 15, 2024

(51) Int. Cl.
*B60L 58/20* (2019.01)
*B60L 50/60* (2019.01)
*H02J 1/00* (2006.01)
*H02J 1/08* (2006.01)

(52) U.S. Cl.
CPC .............. *B60L 58/20* (2019.02); *B60L 50/60* (2019.02); *H02J 1/002* (2020.01); *H02J 1/082* (2020.01); *B60L 2210/10* (2013.01); *H02J 2310/48* (2020.01)

(58) Field of Classification Search
CPC ...... B60L 58/20; B60L 50/60; B60L 2210/10; H02J 1/082; H02J 1/002; H02J 2310/48

USPC ..................................... 701/22, 490
See application file for complete search history.

(56) References Cited

U.S. PATENT DOCUMENTS

| | | | |
|---|---|---|---|
| 6,370,050 B1* | 4/2002 | Peng ................... | H02M 7/4807 363/17 |
| 8,928,802 B2* | 1/2015 | Peuser .................. | G03B 15/03 348/265 |
| 11,987,148 B1* | 5/2024 | Kang ................ | H02M 3/33584 |
| 2006/0086981 A1* | 4/2006 | Yamaguchi ........... | H02M 7/003 257/347 |
| 2007/0139975 A1* | 6/2007 | Yamauchi ......... | H02M 3/33584 363/16 |

(Continued)

OTHER PUBLICATIONS

Jung-min Park et al., Voltage-Sharing Control Method of Series-Connected Bi-directional DC-DC Converters based on Battery SOC for Hybrid Electric Vehicle, 2018 IEEE Xplore, pp. 1-5 (pdf).*

(Continued)

*Primary Examiner* — Manglesh M Patel
(74) *Attorney, Agent, or Firm* — CANTOR COLBURN LLP (57) ABSTRACT

A vehicle system includes DC/DC converters configured to receive electrical currents from high voltage battery modules and output regulating electrical currents to a low voltage battery. The vehicle system includes a control system coupled to the DC/DC converters, the high voltage battery modules, and the low voltage battery, where the control system is configured to control the DC/DC converters to recirculate one or more of the electrical currents back to one or more of the high voltage battery modules in order to balance states of charge in the high voltage battery modules.

20 Claims, 8 Drawing Sheets

(56) References Cited

U.S. PATENT DOCUMENTS

| | | | |
|---|---|---|---|
| 2010/0097031 A1* | 4/2010 | King | B60L 53/14 320/109 |
| 2013/0342167 A1* | 12/2013 | Bissontz | B60L 58/22 320/118 |
| 2014/0244082 A1* | 8/2014 | Caron | B60L 50/61 290/40 R |
| 2015/0314702 A1* | 11/2015 | Yang | B60L 58/12 701/22 |
| 2015/0336468 A1* | 11/2015 | Sugiyama | B60L 58/21 701/22 |
| 2016/0052423 A1* | 2/2016 | Zhou | B60L 15/06 701/22 |
| 2016/0137093 A1* | 5/2016 | Shrinkle | B60L 58/25 320/126 |
| 2018/0226879 A1* | 8/2018 | Wang | H02M 7/5395 |
| 2019/0027950 A1* | 1/2019 | Carrizales | H02M 3/33584 |
| 2019/0168632 A1* | 6/2019 | Deng | B60L 50/64 |
| 2019/0359199 A1* | 11/2019 | Yoon | H01M 8/0606 |
| 2020/0031238 A1* | 1/2020 | Kydd | H02J 9/062 |
| 2020/0282853 A1* | 9/2020 | Paryani | B60L 53/22 |
| 2021/0075070 A1* | 3/2021 | Falls | H02M 3/33584 |
| 2021/0242712 A1* | 8/2021 | Izawa | B60R 16/033 |
| 2022/0371462 A1* | 11/2022 | Isaksson | B60L 53/57 |
| 2023/0132798 A1* | 5/2023 | Zomorodi | H02J 7/0047 320/104 |
| 2023/0197336 A1* | 6/2023 | Harkness | H01F 27/24 336/212 |
| 2023/0202343 A1* | 6/2023 | Song | B60L 58/20 307/10.1 |
| 2023/0234473 A1* | 7/2023 | Gannamaneni | B60L 58/20 701/22 |
| 2023/0322204 A1* | 10/2023 | Telford | B60L 7/16 701/22 |
| 2024/0278687 A1* | 8/2024 | Ahmed | B60L 58/20 |
| 2024/0283243 A1* | 8/2024 | Ahmed | B60L 1/00 |
| 2024/0283249 A1* | 8/2024 | Ahmed | B60L 58/12 |
| 2024/0343161 A1* | 10/2024 | Mademlis | G01R 31/389 |
| 2024/0356359 A1* | 10/2024 | Zhang | H02J 7/06 |

OTHER PUBLICATIONS

Jigar Patel et al., Bi-directional DC-DC Converter for battery charging-discharging Applications using Buck-Boost switch, 2012 IEEE Xplore, pp. 1-4 (pdf).*

Tian-E Fan et al., A fast active balancing strategy based on model predictive control for lithium-ion battery packs, Jun. 2023, Elsevier, pp. 1-14 (pdf).*

Guangwei Wan et al., Improved Battery Balancing Control Strategy for Reconfigurable Converter Systems, Jul. 2023, MDPI, pp. 1-21 (pdf).*

Muhammad Zarkab et al., Model Predictive Control for Modular Electric Vehicle Charger, 2020, IEEE, pp. 1-6(pdf).*

Matthias Preindl, A Battery Balancing Auxiliary Power Module with Predictive Control for Electrified Transportation, 2017, IEEE, pp. 1-8 (pdf).*

\* cited by examiner

OPTIMAL CONTROL STRATEGY FOR A DISTRIBUTED LOW VOLTAGE SYSTEM WITH BIDIRECTIONAL DIRECT CURRENT CONVERTERS

INTRODUCTION

The disclosure relates to power control systems for a vehicle, and more particularly to providing an optimal control strategy for a distributed low voltage system with bidirectional direct current (DC) converters.

In general, vehicles include many different electrical systems. These electrical systems include, but are not limited to, infotainment systems, lighting systems, power steering systems, power braking system, driver assistance systems, various sensors, heating and air conditioning systems, and the like. Many of these electrical systems operate on a low voltage (i.e., 48 volts (V)) bus that traditionally receives power from a low voltage battery.

Recently, electric and hybrid vehicles have been developed which include high voltage (i.e., >400V) battery packs and it is desirable to power the low voltage bus with the high voltage battery pack.

SUMMARY

In one exemplary embodiment, a vehicle system is provided. The vehicle system includes a direct current to direct current (DC/DC) converters configured to receive electrical currents from high voltage battery modules and output regulating electrical currents to a low voltage battery. The vehicle system includes a control system coupled to the DC/DC converters, the high voltage battery modules, and the low voltage battery, where the control system is configured to control the DC/DC converters to recirculate one or more of the electrical currents back to one or more of the high voltage battery modules in order to balance states of charge in the high voltage battery modules.

In addition to the one or more features described herein the control system is configured to cause the DC/DC converters to output a value of zero for the regulating electrical currents in response to no load current.

In addition to the one or more features described herein the control system is configured to control the DC/DC converters to recirculate the one or more of the electrical currents back to the one or more of the high voltage battery modules such that a sum of recirculating the one or more electrical currents is zero without interfering with a value of the regulating electrical currents to the low voltage battery.

In addition to the one or more features described herein the control system is configured to cause the DC/DC converters to output a value of zero for the regulating electrical currents by recirculating the one or more of the electrical currents back to the one or more of the high voltage battery modules.

In addition to the one or more features described herein the control system is configured to determine that the one or more of the high voltage battery modules has a lower state of charge than another one or more of the high voltage battery modules.

In addition to the one or more features described herein, in response to determining that the one or more of the high voltage battery modules has the lower state of charge than another one or more of the high voltage battery modules, the control system is configured to recirculate the one or more of the electrical currents from the another one or more of the high voltage battery modules back to the one or more of the high voltage battery modules having the lower state of charge.

In addition to the one or more features described herein recirculating the one or more electrical currents comprises at least one of the high voltage battery modules providing the one or more electrical currents to the DC/DC converters and the one or more of the high voltage battery modules receiving the one or more electrical currents from the DC/DC converters. The control system is configured to cause the DC/DC converters to output a value of the electrical currents that is adjusted based at least in part on thermal outlook of the DC/DC converters.

In one exemplary embodiment, a method is provided. The method includes coupling a control system to direct current to direct current (DC/DC) converters, the DC/DC converters being configured to receive electrical currents from high voltage battery modules and output regulating electrical currents to a low voltage battery. The method includes controlling, by the control system, the DC/DC converters to recirculate one or more of the electrical currents back to one or more of the high voltage battery modules in order to balance states of charge in the high voltage battery modules.

In addition to the one or more features described herein the control system is configured to cause the DC/DC converters to output a value of zero for the regulating electrical currents in response to no load current.

In addition to the one or more features described herein the control system is configured to control the DC/DC converters to recirculate the one or more of the electrical currents back to the one or more of the high voltage battery modules such that a sum of recirculating the one or more electrical currents is zero without interfering with a value of the regulating electrical currents to the low voltage battery.

In addition to the one or more features described herein the control system is configured to cause the DC/DC converters to output a value of zero for the regulating electrical currents by recirculating the one or more of the electrical currents back to the one or more of the high voltage battery modules.

In addition to the one or more features described herein the control system is configured to determine that the one or more of the high voltage battery modules has a lower state of charge than another one or more of the high voltage battery modules.

In addition to the one or more features described herein, in response to determining that the one or more of the high voltage battery modules has the lower state of charge than another one or more of the high voltage battery modules, the control system is configured to recirculate the one or more of the electrical currents from the another one or more of the high voltage battery modules back to the one or more of the high voltage battery modules having the lower state of charge.

In addition to the one or more features described herein recirculating the one or more electrical currents comprises at least one of the high voltage battery modules providing the one or more electrical currents to the DC/DC converters and the one or more of the high voltage battery modules receiving the one or more electrical currents from the DC/DC converters. The control system is configured to cause the DC/DC converters to output a value of the electrical currents that is adjusted based at least in part on thermal outlook of the DC/DC converters.

In one exemplary embodiment, a vehicle system is provided. The vehicle system includes a memory having computer readable instructions, and a processing device for executing the computer readable instructions, the computer readable instructions controlling the processing device to perform a method. The method includes controlling direct current to direct current (DC/DC) converters, such that the DC/DC converters are configured to receive electrical currents from high voltage battery modules and output regulating electrical currents to a low voltage battery. The method includes controlling the DC/DC converters to recirculate one or more of the electrical currents back to one or more of the high voltage battery modules in order to balance states of charge in the high voltage battery modules.

In addition to the one or more features described herein 16. The vehicle system of claim 15, wherein the processing device is configured to cause the DC/DC converters to output a value of zero for the regulating electrical currents.

In addition to the one or more features described herein the processing device is configured to cause the DC/DC converters to recirculate the one or more of the electrical currents back to the one or more of the high voltage battery modules such that a sum of recirculating the one or more electrical currents is zero without interfering with a value of the regulating electrical currents to the low voltage battery.

In addition to the one or more features described herein the processing device is configured to cause the DC/DC converters to output a value of zero for the regulating electrical currents by recirculating the one or more of the electrical currents back to the one or more of the high voltage battery modules.

In addition to the one or more features described herein the processing device is configured to determine that the one or more of the high voltage battery modules has a lower state of charge than another one or more of the high voltage battery modules.

In addition to the one or more features described herein, in response to determining that the one or more of the high voltage battery modules has the lower state of charge than another one or more of the high voltage battery modules, the processing device is configured to recirculate the one or more of the electrical currents from the another one or more of the high voltage battery modules back to the one or more of the high voltage battery modules having the lower state of charge.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As discussed above, high voltage (i.e., >400V) battery packs have recently been added to both electric and hybrid vehicles and it is desirable to power a low voltage bus of these vehicles with the high voltage battery pack. In order to provide low voltage power from a high voltage battery pack, a voltage regulator is needed. In general, voltage regulators, such as direct current to direct current (DC/DC) converters require controllers to operate the DC/DC converters.

Exemplary embodiments provide multiple bidirectional DC/DC converters in a distributed low voltage system, which are coordinated through an optimal controller that employs a mathematical model of the low voltage system. The controller minimizes the state of charge balancing errors while meeting strict constraints to avoid any potential issues with the high voltage battery modules and DC/DC converters in real time. Exemplary embodiments extend the range of the vehicle by state of charge balancing.

According to exemplary embodiments, technical solutions may include automatic control of the distributed low voltage system with control knobs, real-time constraints on current control to avoid potential issues with the low voltage system, and active state of charge balancing through optimal distribution of current commands to DC/DC converters. Exemplary embodiments provide voltage droop adjustment to ensure optimal load sharing between DC/DC converters, can minimize coupling between a model predictive control (MPC) and low-level control of the low voltage regulator, provide supervisory control in the MPC for DC/DC converter physical, thermal, and loss handling, and provide DC-DC converter shifting to a higher efficiency operating point.

Figure 1:
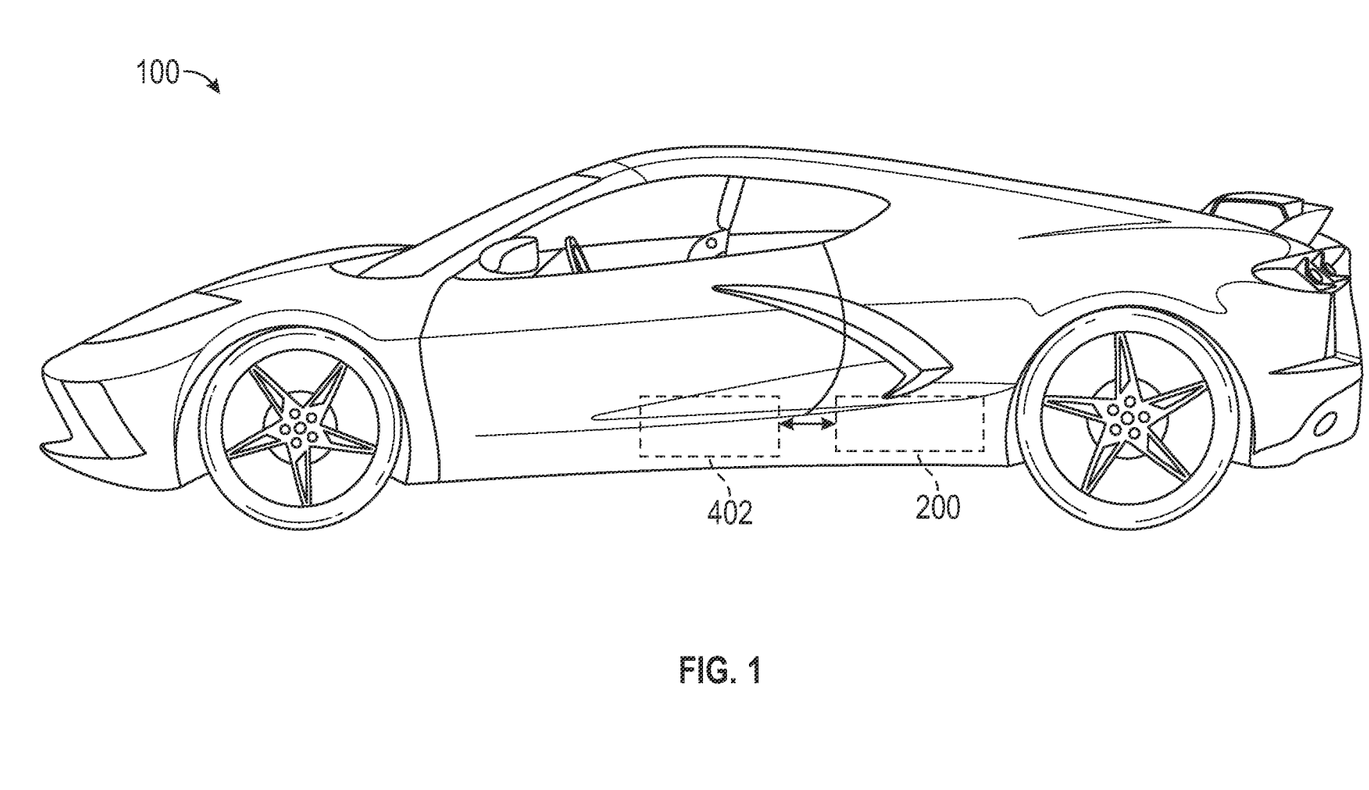
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a power supply system 200. In one embodiment, the vehicle 100 is a hybrid vehicle that utilizes both an internal combustion engine and an electric motor drive system. In another embodiment, the vehicle 100 is one of an electric vehicle propelled only by an electric motor or multiple electric motors. In another embodiment, the vehicle 100 is of conventional type and propelled by an internal combustion engine.

Electric vehicles (EVs) such as battery electric vehicles (BEVs), hybrid vehicles, and/or fuel cell vehicles include one or more electric machines and a high-voltage battery pack. A power control system 402 (depicted in FIG. 4) is used to control charging and/or discharging of the high-voltage battery system. The power control system includes an accessory power module (APM) that is configured to provide low-voltage power to one or more electrical systems of the vehicle.

Figure 2A:
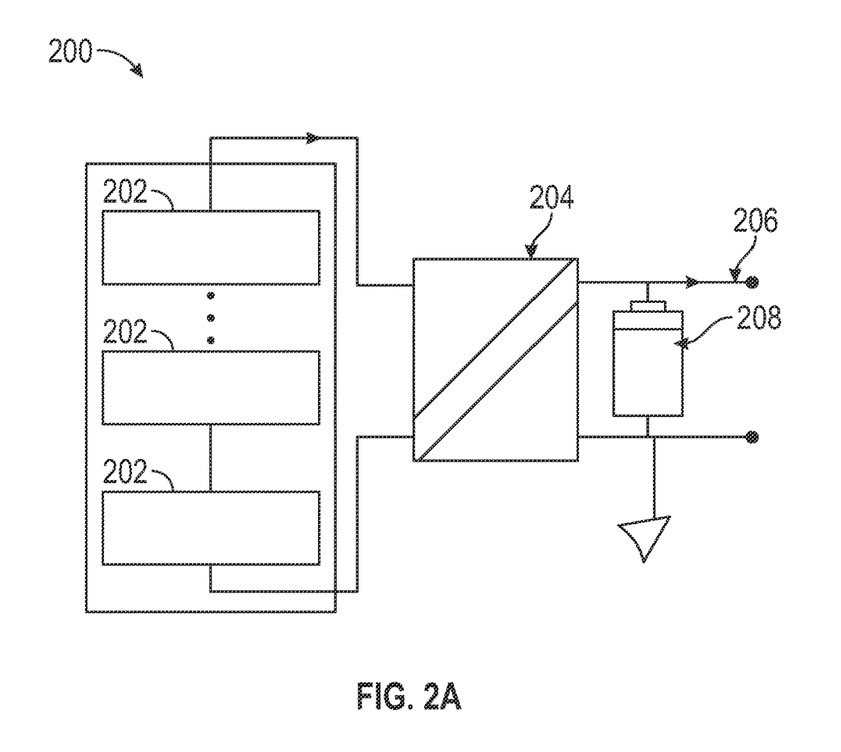
FIG. 2A is a block diagram illustrating a portion of a power supply system for a vehicle in accordance with an exemplary embodiment.

Referring now to FIG. 2A, a block diagram illustrating a portion of power supply system 200 for a vehicle in accordance with an exemplary embodiment is shown. The power supply system 200 includes a plurality of high voltage battery modules 202 that are connected in series to form a high voltage battery pack. The high voltage battery pack is connected to a DC/DC converter 204 that is configured to provide a reduced, or low voltage, to a low voltage bus 206. In exemplary embodiments, the power supply system 200 also includes a low voltage battery 208 that is also connected to the low voltage bus 206.

Figure 2B:
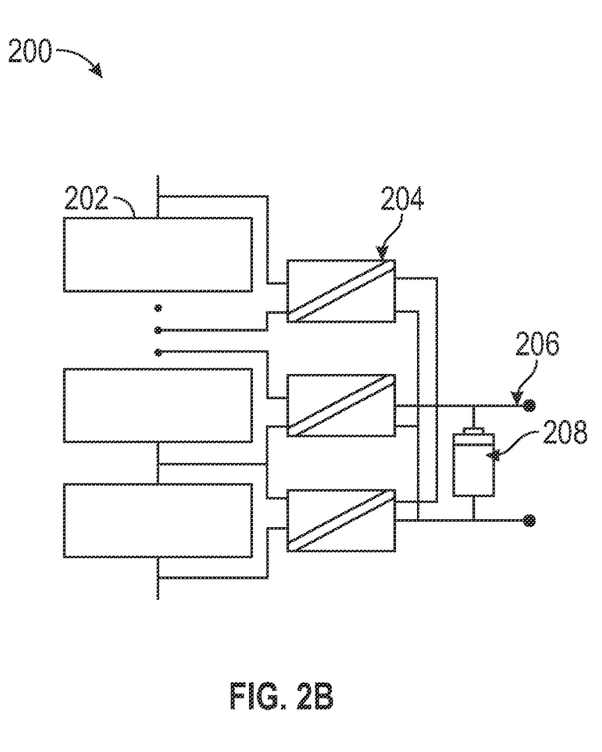
FIG. 2B is a block diagram illustrating a portion of a power supply system for a vehicle in accordance with another exemplary embodiment.

Referring now to FIG. 2B, a block diagram illustrating a portion of a power supply system 200 for a vehicle in accordance with another exemplary embodiment is shown. The power supply system 200 includes a plurality of high voltage battery modules 202 that are connected in series to form a high voltage battery pack. Each high voltage battery module 202 is connected to a separate DC/DC converter 204 that is configured to provide a reduced, or low voltage, to a low voltage bus 206. In exemplary embodiments, the power supply system 200 also includes a low voltage battery 208 that is also connected to the low voltage bus 206. In exemplary embodiments, each of the DC/DC converters 204 are connected to one another in parallel.

Figure 3:
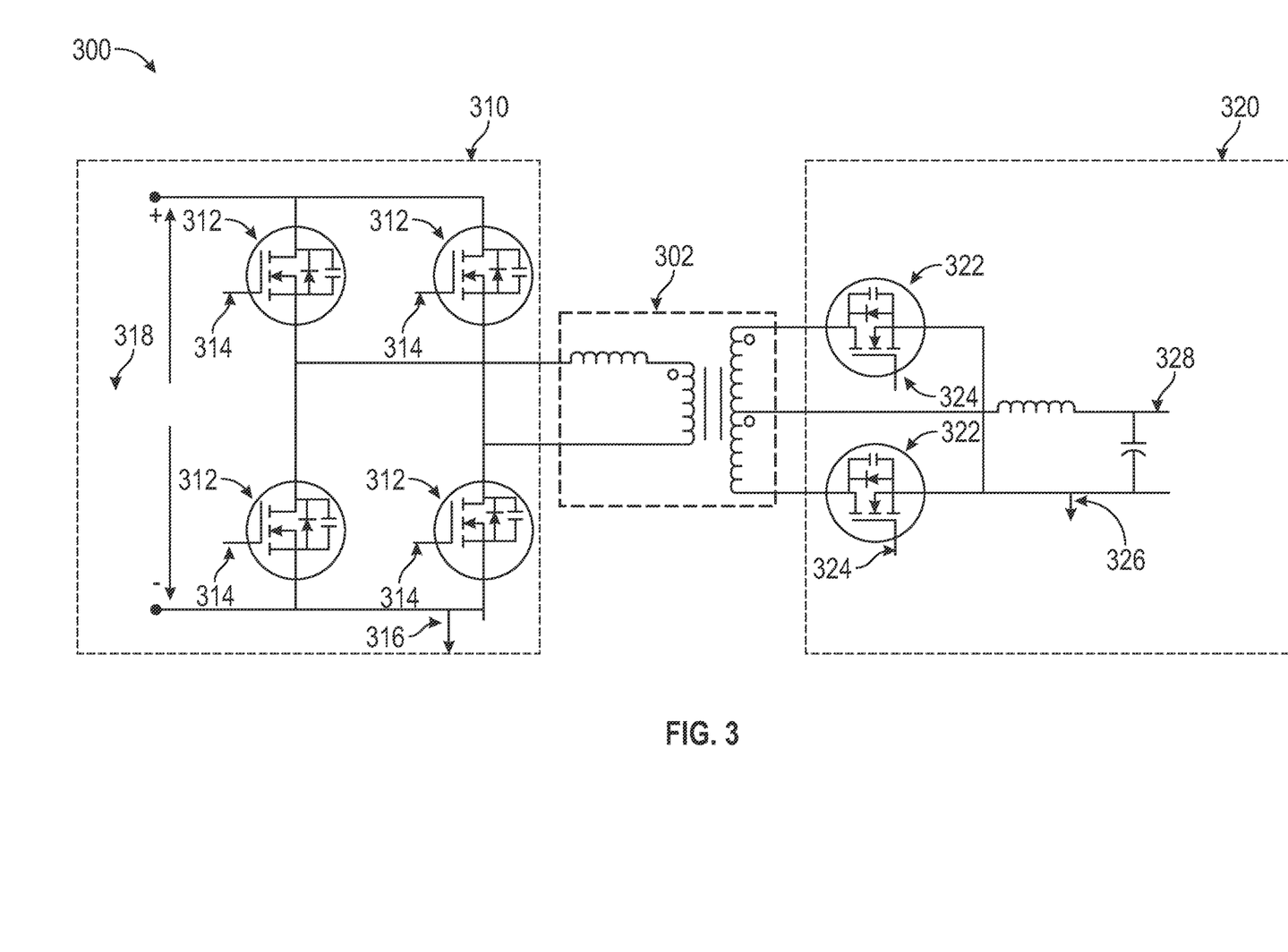
FIG. 3 is a schematic illustrating an isolated power converter in accordance with an exemplary embodiment.

In exemplary embodiments, the DC/DC converters of the power supply system 200 are isolated converters, (i.e., there is no direct conduction path between two parts of the circuit). The isolation will present a barrier between the input stage and the output stage. Isolation can be created by incorporating a transformer in the circuit so that power is transferred using electromagnetic energy. FIG. 3 is a schematic illustrating an isolated power converter 300 in accordance with an exemplary embodiment. The isolated power converter 300 is configured to receive an input voltage 318, which may be a high voltage in excess of approximately 400 Volts and to provide an output voltage 328, which may be a low voltage of approximately 48 Volts or less.

The isolated power converter 300 includes an input stage 310, also referred to as a primary stage, and an isolated or output stage 320. The input stage 310 includes a primary ground 316 that is separate from an isolated ground 326 of the isolated or output stage 320. The isolated power converter 300 includes a transformer 302 configured to transfer power from the primary stage 310 to the isolated or output stage 320. As illustrated, the primary stage 310 includes a plurality of transistors 312 that are controlled by applying bias signals 314 to the gate of the transistors 312. Likewise, the isolated stage 320 includes a plurality of transistors 322 that are controlled by applying bias signals 324 to the gate of the transistors 322. In exemplary embodiments, the bias signals 314, 324 are used to control the output voltage 328 of the isolated power converter 300.

In one embodiment, the power for the bias signals 314, 324 may be provided by a low voltage battery disposed within the vehicle. In one embodiment, the power for the bias signals 314, 324 may be provided by a control system 402 depicted in FIG. 4.

Figure 4:
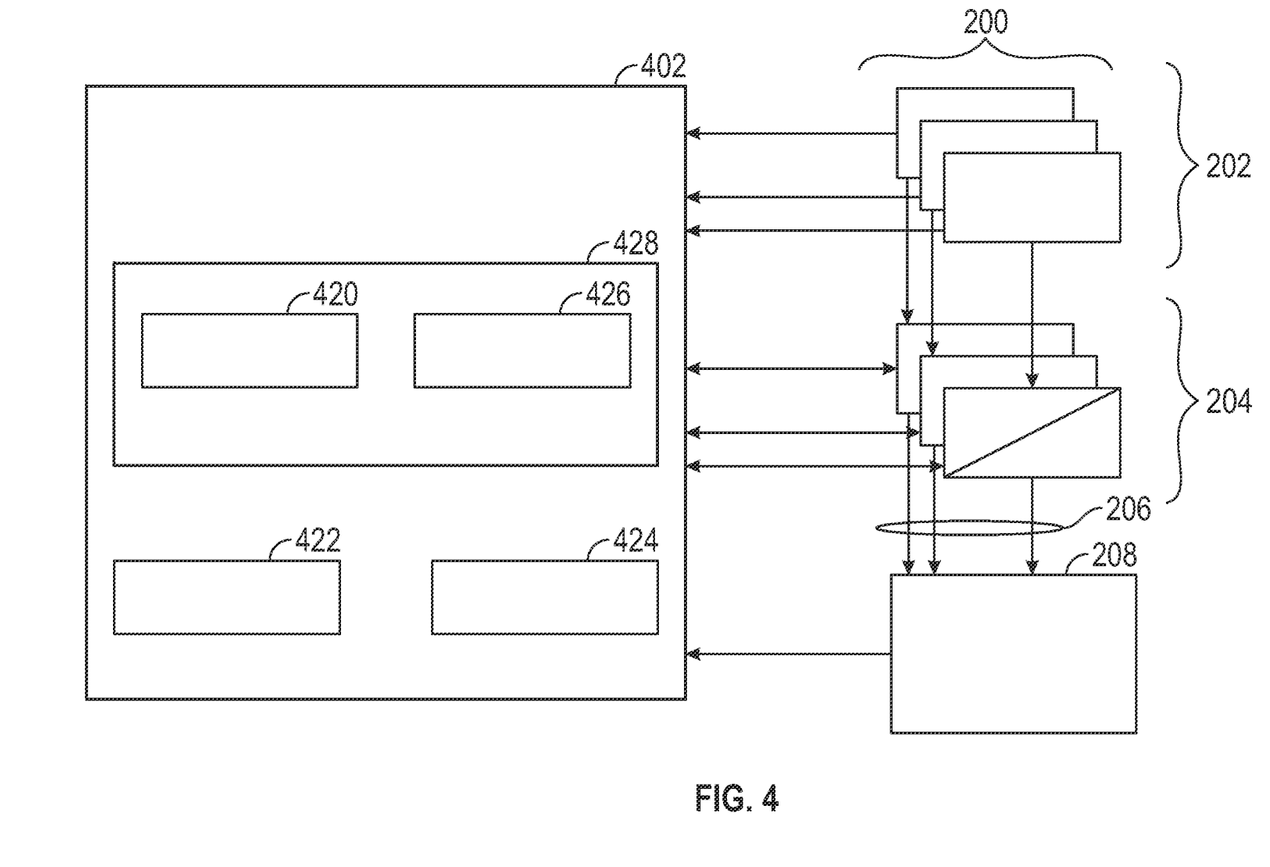
FIG. 4 is a block diagram illustrating a power supply system connected to a control system in accordance with an exemplary embodiment.

Referring now to FIG. 4, a block diagram illustrating the power supply system 200 connected to the control system 402 in accordance with an exemplary embodiment is shown. The power supply system 200 includes bidirectional DC/DC converters 204 configured to individually convert a high voltage of each high voltage battery module 202 to a low voltage on the low voltage bus 206, thereby regulating electrical currents produced by the high voltage battery modules 202 to electrical currents on the low voltage bus 206 for the low voltage battery 208.

The control system 402 includes a model predictive control (MPC) 420, a high voltage model 422, a low voltage regulator 424, and a controller 428. The controller 428 includes the MPC 420 and a real-time combiner 426. The control system 402 is configured to control the bidirectional DC/DC converters 204 in a distributed low voltage system by employing a mathematical model of the power supply system 200. The control system 402 minimizes the state of charge (SOC) balancing errors while meeting strict constraints to avoid any potential issues with high voltage battery modules 202 and the DC/DC converters 204 in real-time. Each high voltage battery module 202 has a state of charge that is the level of charge relative to its capacity. In the control system 402, the MPC 420 is configured to optimally distribute low currents of the DC/DC converters 204 to minimize a state of charge imbalance with strict constraints for malfunction avoidance to the high voltage battery modules 202 and the DC/DC converters 204. In other words, when the high voltage battery modules 202 have different states of charge, the control system 402 works to balance the states of charge for each high voltage battery module 202 to be the same or nearly the same by recirculating high currents from one or more high voltage battery modules 202 having a higher state of charge to one or more high voltage battery modules 202 having a lower state of charge, according to exemplary embodiments. Further, the MPC 420 is configured to ensure that the summation of output low voltage currents from the DC/DC converters 204 is maintained to be zero (for example, the low voltage output to the low voltage battery 208 is maintained constant when the load current from the low voltage battery 208 is zero), and this removes interaction between the supervisory control of the MPC 420 and the low-level control of the low voltage regulator 424, according to an exemplary embodiment. The control system 402 is configured to switch from charging the low voltage battery 208 to charging one or more high voltage battery modules 202 having a lower state of charge, when the low voltage output to the low voltage battery 208 is maintained constant and/or when the load current from the low voltage battery 208 is zero (i.e., no load current).

Any of the modules in the control system 402, including the MPC 420, the high voltage model 422, the controller 428, the low voltage regulator 424, and the real-time combiner 426, can be implemented as instructions stored on a computer-readable storage medium, as hardware modules, as special-purpose hardware (e.g., application specific hardware, application specific integrated circuits (ASICs), as embedded controllers, hardwired circuitry, etc.), and/or as some combination or combinations of these. In examples, the modules can be a combination of hardware and programming. The programming can be processor executable instructions stored on a tangible memory, and the hardware can include processing circuitry (e.g., processors) for executing those instructions. Thus, a system memory can store program instructions that when executed by processing circuitry implement the modules described herein. Alternatively, or additionally, the modules can include dedicated hardware, such as one or more integrated circuits, Application Specific Integrated Circuits (ASICs), Application Specific Special Processors (ASSPs), Field Programmable Gate Arrays (FPGAs), and/or any combination of the foregoing examples of dedicated hardware, for performing the techniques described herein.

Figure 8:
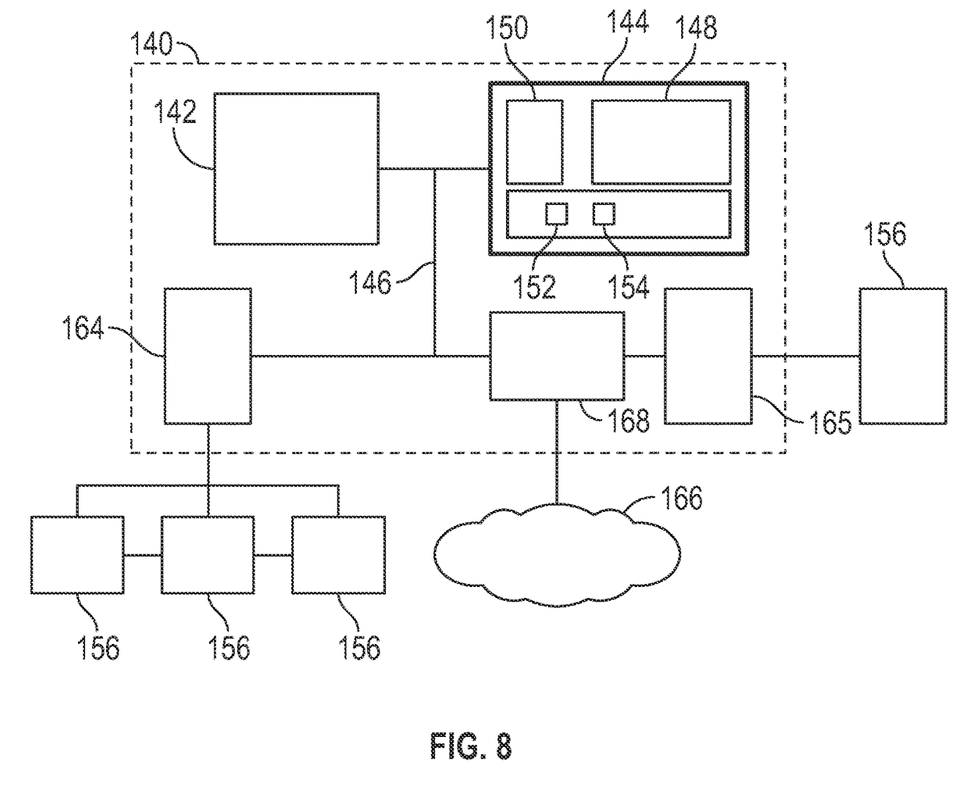
FIG. 8 depicts a computer system used to implement features discussed herein in accordance with an exemplary embodiment.

The control system 402 can include any of the functionality including software and hardware components discussed in a computer 140 depicted in FIG. 8 and discussed further herein.

Figure 5:
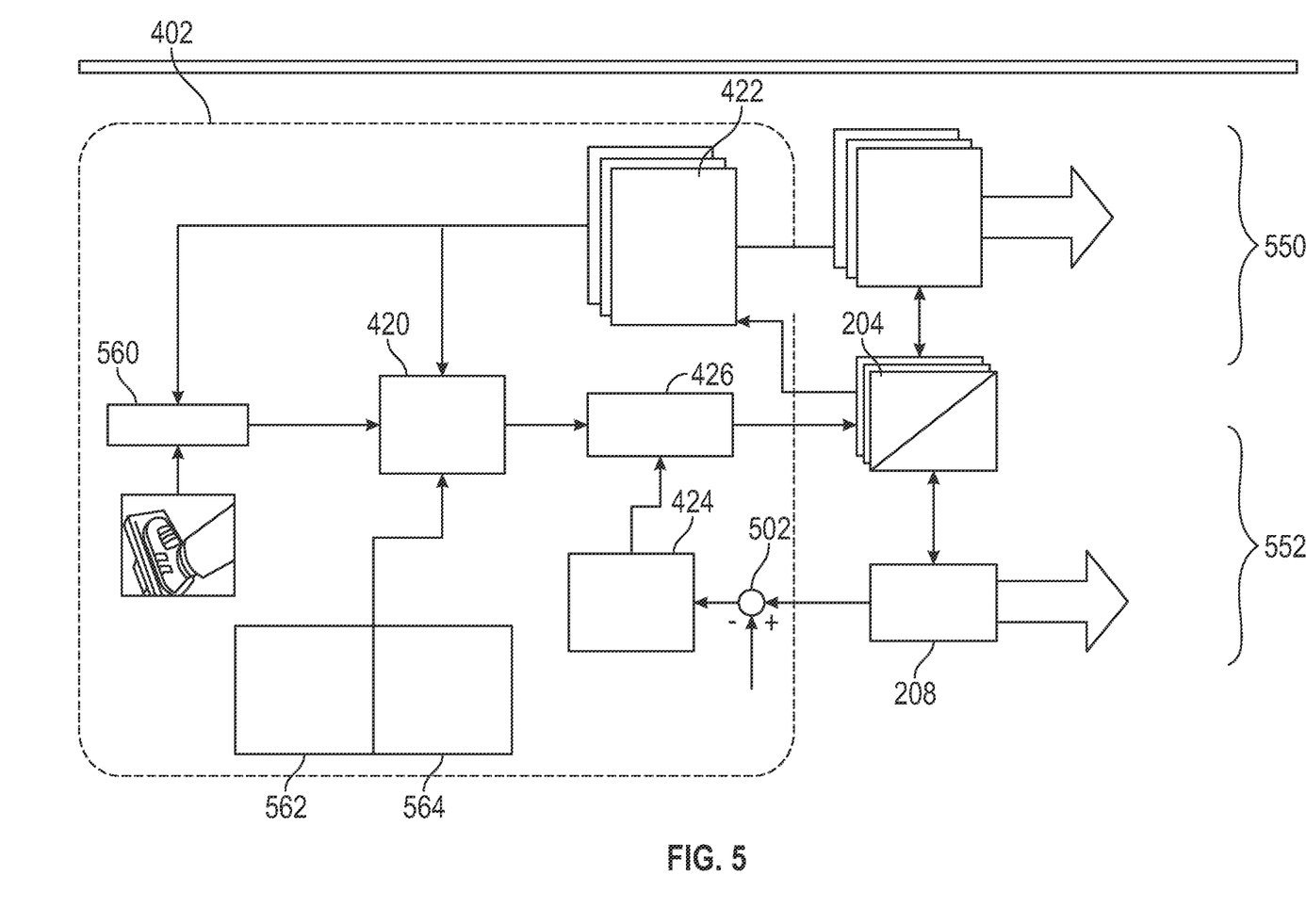
FIG. 5 is a block diagram illustrating operations of a control system to control DC/DC converters in accordance with an exemplary embodiment.

FIG. 5 is a block diagram illustrating operations of the control system 402 to control the DC/DC converters 204 to balance the states of charge for the high voltage battery modules 202 in accordance with an exemplary embodiment. The MPC 420 optimally distributes currents of DC/DC converters 204 to minimize a state of charge imbalance among high voltage battery modules 202 with strict constraints for malfunction avoidance. The control system 402 can cause the DC/DC converters 204 to draw different currents from the respective high voltage battery modules 202 and return current to any high voltage battery module 202 having a lower state of charge, until the states of charge equalize for the high voltage battery modules 202. FIG. 5 illustrates a slow loop 550 including the MPC 420, the real-time combiner 426, the DC/DC converters 204, the high voltage battery modules 202, and the high voltage model 422. A fast loop 552 includes the low voltage regulator 424, the real-time combiner 426, the DC/DC converters 204, the low voltage battery 208, and the summation 502. In the fast loop 552, the low voltage regulator 424 provides an output (i.e., commands including the desired DC/DC converter current to regulate voltage of the low voltage battery 208) faster than the MPC 420 can provide its output. The low voltage regulator 424 in the fast loop 552 minimizes low voltage deviation due to load current in real time. Accordingly, the MPC 420 provides a known optimal solution (e.g., using techniques understood by one of ordinary skill in the art) that includes values of the currents for the desired states of charge for the high voltage battery modules 202, such that the DC/DC converters 204 can recirculate the currents back to the high voltage battery modules 202 having a lower state of charge from high voltage battery modules 202 having a higher state of charge in accordance with one or more exemplary embodiments.

In FIG. 5, the MPC 420 is an advanced method of a process control that is used to control a process while satisfying a set of constraints. The models used in MPCs are generally intended to represent the behavior of a complex dynamical system. In the MPC 420, physics and mathematical based models are used to model the power supply system 200 along with inputs from various constraints from constraint box 560, inputs (e.g., thermal outlook) from thermal and electrical models 562 for the DC/DC converters 204, and input of an optimal efficiency point 564.

The MPC 420 is configured to receive from the high voltage models 422 voltages and states of charge of each of the high voltage battery modules 202. The high voltage model 422 is a model configured as a high voltage state of charge observer and a high voltage state of power prediction. The high voltage models 422 output the state of charge, the state of power, and the voltages of the high voltage battery modules 202, respectively. Also, the high voltage model 422 outputs the load current $i_{HV}(t)$ shared by each of the high voltage battery modules 202, along with a maximum current $i_j^{max}$, and a minimum current $i_j^{min}$ for each high voltage battery module 202, where the subscript "j" is from 1 to N for the number of DC/DC converters 204 which equals the number of high voltage battery modules 202. In a one-to-one relationship, each high voltage battery module 202 has its own high voltage model 422 and its own DC/DC converter 204. For each high voltage battery module 202, the high voltage models 422 receive the load current $i_{HV}(t)$, temperature, and $V_j(t)$, where $V_j(t)$ is the voltage at an individual DC/DC converter on the high side at time t.

Referring to FIG. 5, the constraint box 560 can be a data structure in memory (e.g., system memory 144 in FIG. 8) associated with one or more algorithms for processing input and providing output to the MPC 420. The constraint box 560 is coupled to the high voltage models 422 to receive a load current $i_{HV}(t)$, the maximum positive current $i_j^{max}$, and the minimum negative $i_j^{min}$ for each high voltage battery module 202. The constraint box 560 also receives the operation of the throttling by the DC/DC converters 204. As the output from the constraint box 560, the MPC 420 receives a maximum current $i_{DC}^{max}$ of the DC/DC converters 204 along with a maximum current $i_{ij}^{max}$ and a minimum current $i_{ij}^{min}$ of the $j^{th}$ DC/DC converter 204, respectively. The $i_{DC}^{max}$ is the maximum current of the DC/DC converter 204 that is allowed, such that if the maximum current of all DC/DC converters 204 were equal, then the maximum current $i_{ij}^{max}$=maximum current $i_{DC}^{max}$. As a reference, it is noted that the subscript "j" denotes "individual" such that $i_{ij}$ is an individual current of "#j" DC converter.

The MPC 420 is configured to output an intermediate current command $i_{ij}^{des}$ for each individual DC/DC converter 204 to the real-time combiner 426 in preparation for the real-time combiner 426 to cause the total low voltage currents output from the DC/DC converter 204 to be zero assuming the desired current from low voltage regulator 424 is zero. As the intermediate current commands $i_{ij}^{des}$ for each individual DC/DC converter 204, the MPC 420 calculates values for the currents that need to be drawn from the high voltage battery modules 202 in order to balance the states of charge. For example, the MPC 420 can determine that a high voltage battery module 202 with a higher state of charge is required to output a greater value of current than a high voltage battery module 202 with a lower state of charge, in order to eventually balance the states of charge. Based on the respective currents needed for balancing the states of charge of the high voltage battery modules 202 determined by the MPC 420, the real-time combiner 426 takes the intermediate current commands $i_{ij}^{des}$ destined for each individual DC/DC converter 204 and add the low voltage regulator current $i_{LV}^{reg}$ to determine desired input current of individual DC/DC converters 204.

Figure 6:
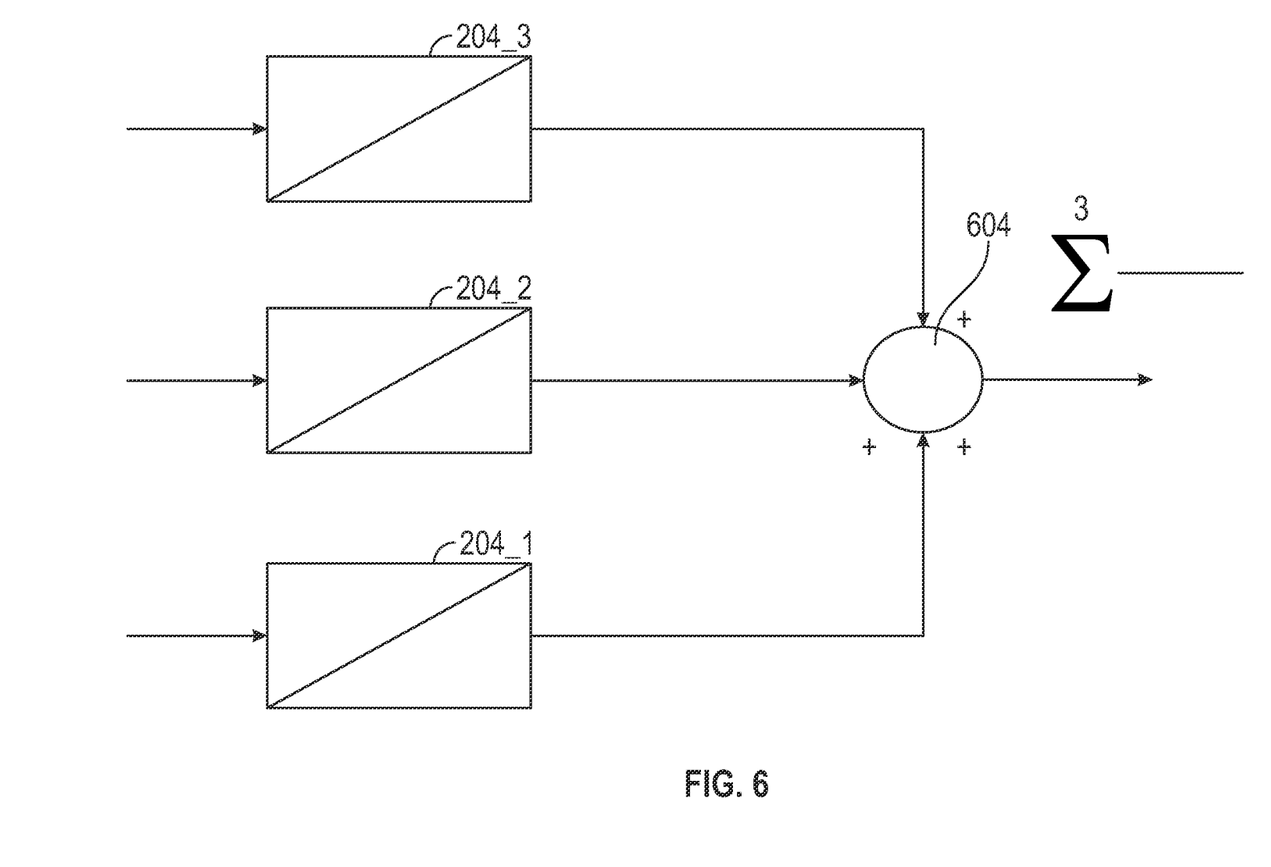
FIG. 6 is a block diagram of a representation of DC/DC converters being managed a low voltage regulator using a high frequency current command in accordance with an exemplary embodiment.

The output from the real-time combiner 426 is the final current commands $i_{ij}^{des,final}$ for each of the DC/DC converters 204 to achieve the balanced states of charge using the high voltage battery modules 202. The final current commands $i_{ij}^{des,final}$ are the final current command respectively provided to each individual DC/DC converter 204 after adding $i_{LV}^{reg}$ to $i_{ij}^{des}$ in combiner 426 in order to balance the states of charge among all of the high voltage battery modules 202, as well as to provide the desired low voltage regulator current. As illustrated in in FIG. 6, a block diagram is shown of a representation of how the MPC decouples the low voltage regulator from active balancing of the states of charge for the high voltage battery modules. The high voltage battery modules 202 (not shown in FIG. 6) are individually characterized as a first high voltage battery module, a second high voltage battery module, and a third high voltage battery module respectively connected to DC/DC converter 204_1, DC/DC converter 204_2, and DC/DC converter 204_3 in FIG. 6. As the intermediate current commands $i_{ij}^{des}$ for each individual DC/DC converter 204, the MPC 420 (not shown in FIG. 6) provides the individual balancing currents $i_{ij}^{des}$ ($i_{i1}^{des}$, $i_{i2}^{des}$, $i_{i3}^{des}$) for balancing the states of charge for the first, second, and third high voltage battery modules 202. The real-time combiner 426 provides the final current commands $i_{ij}^{des,final}$ that sum $i_{ij}^{des}$ and $i_{LV}^{reg}$ where output current summation of DC/DC converters due to balancing current, $$\sum_{j=1}^{3} \frac{V_j(k)}{V_{LV}(k)} i_{ij}^{des},$$

is equal to zero. The MPC makes at least one (but not all) of the individual balancing currents $i_{ij}^{des}$ ($i_{i1}^{des}$, $i_{i2}^{des}$, $i_{i3}^{des}$) have a negative value, which means that the current is recirculating at least one of the individual high voltage currents back to the corresponding high voltage battery module 202 having the lower state of charge, without affecting the low voltage regulator $i_{LV}^{reg}$. It is noted that the balancing currents $i_{ij}^{des}$ ($i_{i1}^{des}$, $i_{i2}^{des}$, $i_{i3}^{des}$) are electrical currents from the high voltage battery modules 202 greater than what is required to provide the low voltage regulator current $i_{LV}^{reg}$ needed by the low voltage battery 208. Accordingly, the balancing currents $i_{ij}^{des}$ ($i_{i1}^{des}$, $i_{i2}^{des}$, $i_{i3}^{des}$) are recirculated back to at least one high voltage battery modules 202 having a lower state of charge than the other high voltage battery modules 202, in accordance with one or more embodiments.

As further example details regarding the MPC 420, the MPC 420 incorporates an MPC formulation to determine the states of charges for each of the high voltage battery modules 202. The following is the MPC formulation, for example, when the number of high voltage battery modules is three:

$$q_1(k+1) = q_1(k) - h_{HV}(i_{i1}^{des}(k) + i_{LV}^{reg}(k) + i_{HV}(k))T,$$

$$q_2(k+1) = q_2(k) - h_{HV}(i_{i2}^{des}(k) + i_{LV}^{reg}(k) + i_{HV}(k))T,$$

$$q_3(k+1) = q_3(k) - h_{HV}(i_{i3}^{des}(k) + i_{LV}^{reg}(k) + i_{HV}(k))T, \text{ and}$$

$$q_{LV}(k+1) = q_{LV}(k) + h_{LV} \sum_{j=1}^{3} \frac{V_j(k)}{V_{LV}(k)} (i_{ij}^{des}(k) + i_{LV}^{reg}(k))T + h_{LV} i_{LV}(k)T,$$

where $q_1(k)$ is the present state of charge for the first high voltage battery module that comprises high voltage batteries, $q_2(k)$ is the present state of charge for the second high voltage battery module, $q_3(k)$ is the present state of charge for the third high voltage battery module, $q_{LV}(k)$ is the present state of charge for the low voltage battery system (i.e., the low voltage battery 208), $h_{HV}$ is equal to 1/capacity (in amperes*sec) of a high voltage battery module, and $h_{LV}$ is equal to 1/capacity (in amperes*sec) of the low voltage battery 208. The current $i_{ij}^{des}(k)$ is equivalent to current $i_{ij}^{des}$ at time step k, such that the $i_{i1}^{des}(k)$ is the current that flows to the first DC/DC converter from the first high voltage battery module, $i_{i2}^{des}(k)$ is the current that flows to the second DC/DC converter from the second high voltage battery module, and $i_{i3}^{des}(k)$ is the current that flows to the third DC/DC converter from the third high voltage battery module, all of which denote the individual active balancing currents from the MPC. The low voltage regulator current $i_{LV}^{reg}$ is the desired current for low voltage regulation. The terms $q_1(k+1)$, $q_2(k+1)$, and $q_3(k+1)$ denote the states of charge that the MPC 420 is seeking to achieve in the first high voltage battery module, the second high voltage battery module, and third high voltage battery module, respectively, at time step k+1. The term $q_{LV}(k+1)$ is the state of charge for the low voltage battery 208.

The $i_{HV}(k)$ is the load current that is commonly shared with all high voltage battery modules 202. The $i_{LV}(k)$ is the load current of low voltage battery 208. The term T is the time period in seconds (s) that the state of charge is sampled. For example, the next state of charge of the first high voltage battery module is $q_1(k+1)$, which is the state of charge expected after T seconds with the present $q_1(k)$, $i_{i1}^{des}(k)$, $i_{LV}^{reg}(k)$, and $i_{HV}(k)$. The term k represents an increase in time such as the next sample time.

The following sums the balancing current output from each of the DC/DC converters:

$$\sum_{j=1}^{3} \frac{V_j(k)}{V_{LV}(k)} (i_{ij}(k)).$$

In the bidirectional DC/DC converters 204, the MPC 420 is configured to maintain $$\sum_{j=1}^{3} \frac{V_j(k)}{V_{LV}(k)} (i_{ij}^{des}(k)) = 0$$

(as represented at summation 604 in FIG. 6). This allows at least one but not all of the individual high voltage currents $i_{ij}^{des}$ to have a negative value, which causes the DC/DC converters 204 to recirculate the individual currents to the lower state of charge high voltage battery module 202 without interfering the low voltage regulator 424. In one or more exemplary embodiments, the output from the DC/DC converters may correspond to bias currents/bias voltages and/or control bias current/bias voltages.

Additionally, the MPC 420 operates to maintain the following constraints:

$$(-i_1^{max} + i_{HV}(k)) \leq i_{i1}^{des}(k) \leq (-i_1^{min} + i_{HV}(k)),$$

$$(-i_2^{max} + i_{HV}(k)) \leq i_{i2}^{des}(k) \leq (-i_2^{min} + i_{HV}(k)), \text{ and}$$

$$(-i_3^{max} + i_{HV}(k)) \leq i_{i3}^{des}(k) \leq (-i_3^{min} + i_{HV}(k)).$$

For DC/DC converter thermal management, the MPC 420 operates to maintain the following constraint of $i_{user}^{min}(t) \leq i_{ij}^{des}(k) \leq i_{user}^{max}(t)$, where j=1, 2, and 3.

One or more exemplary embodiments may provide various technical solutions and benefits. Technical solutions and benefits may include automatic control of a distributed low voltage system with control knobs, real-time constraints on electrical current control to avoid malfunction of the system, active state of charge balancing through optimal distribution of electrical current commands to DC/DC converters. One or more exemplary embodiments can minimize coupling between the MPC and the low voltage regulator. Further, one or more exemplary embodiments provide a control strategy that regulates the input and/or output ports of the DC/DC converters differentially through a thermal or electrical constraint, and that distributes electrical currents of DC/DC converters to minimize cell-state imbalance with strict constraints for malfunction avoidance. In accordance with one or more exemplary embodiments, a control strategy is provided that achieves circulating charge balance through the inputs of the DC/DC converters when the load current is zero, thereby removing the interaction between supervisory control of the MPC and low level control of the low voltage regulator. Additionally, a control strategy is implemented that makes the summation of balancing output currents from the DC converters be zero, thereby removing the interaction between supervisory control of the MPC and low level control of the low voltage regulator. In accordance with one or more exemplary embodiments, a fast-loop low voltage regulator minimizes low voltage deviation due to load current, and the fast-loop low voltage regulator commands equal amount of current from the individual DC/DC converters for regulation of low voltage. One or more exemplary embodiments provide real-time generation of constraints for malfunction avoidance and provide a voltage droop adjustment control strategy using virtual resistance and/or output voltage setpoint in a selectable or predetermined mode for each converter to ensure optimal load sharing between converters. One or more exemplary embodiments provide for DC/DC converter physical thermal and loss handling, for DC/DC converter shifting to a higher efficiency operating point, and for adjustable constraint for top or bottom module balancing.

Figure 7:
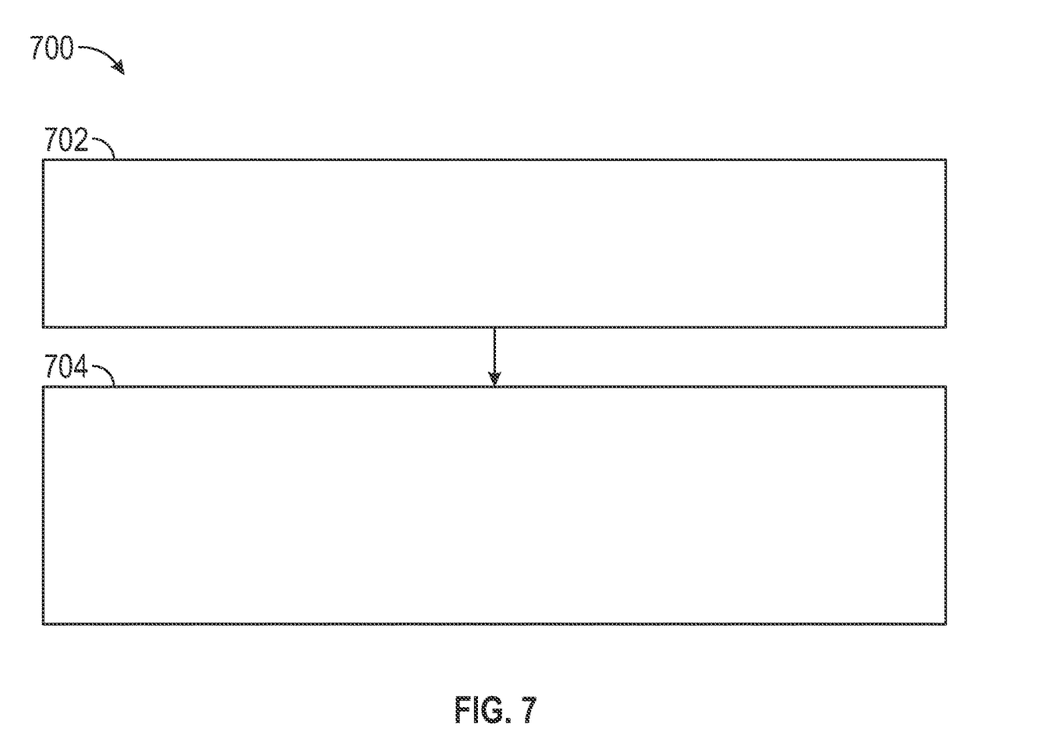
FIG. 7 is a flowchart illustrating a method for providing an optimal control strategy for a distributed low voltage system with bidirectional DC/DC converters to recharge high voltage battery modules by recirculating high voltage electrical currents back to one or more high voltage battery modules in accordance with an exemplary embodiment.

FIG. 7 is a flowchart of a method 700 for providing an optimal control strategy for a distributed low voltage system with bidirectional DC/DC converters to recharge high voltage battery modules by recirculating high voltage electrical currents back to one or more high voltage battery modules in accordance with an exemplary embodiment. Reference can be made to any of the figures discussed herein.

At block 702, the control system 402 is configured to control direct current to direct current (DC/DC) converters 204, such that the DC/DC converters 204 are configured to receive electrical currents from high voltage battery modules 202 and output electrical currents to a low voltage battery 208 in order to regulate voltage of low voltage battery. At block 704, the control system 402 is configured to control the DC/DC converters 204 to recirculate one or more of the electrical currents back to one or more of the high voltage battery modules 202 such that sum of recirculating currents is zero in order to balance states of charge in the high voltage battery modules 202 without interfering with a value of the output electrical currents to low voltage battery.

In one or more exemplary embodiments, the control system 402 is configured to cause the DC/DC converters 204 to output a value of zero for the electrical currents in response to no load current. The control system 402 is configured to control the DC/DC converters 204 to recirculate the one or more of the electrical currents back to the one or more of the high voltage battery modules in response to a low voltage on the low voltage battery 208.

The control system 402 is configured to cause the DC/DC converters 204 to output a value of zero for the electrical currents by recirculating the one or more of the balancing electrical currents back to the one or more of the high voltage battery modules 202. The control system 402 is configured to determine that the one or more of the high voltage battery modules 202 (e.g., high voltage battery module connected to DC/DC converter 204_1 in FIG. 6) has a lower state of charge than another one or more of the high voltage battery modules 202 (e.g., high voltage battery modules connected to DC/DC converters 204_2, 204_3 in FIG. 6). In response to determining that the one or more of the high voltage battery modules 202 has the lower state of charge than another one or more of the high voltage battery modules 202, the control system 402 is configured to recirculate the one or more of the electrical currents from the another one or more of the high voltage battery modules 202 back to the one or more of the high voltage battery modules 202 having the lower state of charge. Recirculating the one or more electrical currents includes at least one of the high voltage battery modules 202 providing the one or more electrical currents to the DC/DC converters 204 and the one or more of the high voltage battery modules 202 receiving the one or more electrical currents from the DC/DC converters 204.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to switching between operating modes. The computer system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure be limited to the particular embodiments disclosed, but will include all embodiments falling within the scope thereof.

What is claimed is:

1. A vehicle system comprising:
   direct current to direct current (DC/DC) converters configured to receive electrical currents from high voltage battery modules and output regulating electrical currents to a low voltage battery; and
   a control system coupled to the DC/DC converters, the high voltage battery modules, and the low voltage battery, wherein the control system is configured to control the DC/DC converters to recirculate one or more of the electrical currents back to one or more of the high voltage battery modules in order to balance states of charge in the high voltage battery modules wherein the control system is configured to control the DC/DC converters to recirculate the one or more of the electrical currents back to the one or more of the high voltage battery modules using a model predictive control, the control being configured to decouple the output regulating electrical currents to the low voltage battery from the balancing states of charge in the high voltage battery modules by controlling such that a sum of recirculating the one or more electrical currents is zero without interfering with a value of the regulating electrical currents to the low voltage battery.

2. The vehicle system of claim 1, wherein the control system is configured to cause the DC/DC converters to output a value of zero for the regulating electrical currents in response to no load current.

3. The vehicle system of claim 1, wherein the model predictive control
   provides a set of individual balancing currents balancing the states of charge for the high voltage battery modules, with each individual balancing current in the set of balancing currents corresponding to one of the high voltage battery modules;
   combines the set of individual balancing currents into a final current command using a real-time combiner, and forces at least one of, and less than all of, the individual balancing currents to have a negative value.

4. The vehicle system of claim 1, wherein the control system is configured to cause the DC/DC converters to output a value of zero for the regulating electrical currents by recirculating the one or more of the electrical currents back to the one or more of the high voltage battery modules.

5. The vehicle system of claim 1, wherein the control system is configured to determine that the one or more of the high voltage battery modules has a lower state of charge than another one or more of the high voltage battery modules.

6. The vehicle system of claim 5, wherein, in response to determining that the one or more of the high voltage battery modules has the lower state of charge than another one or more of the high voltage battery modules, the control system is configured to recirculate the one or more of the electrical currents from the another one or more of the high voltage battery modules back to the one or more of the high voltage battery modules having the lower state of charge.

7. The vehicle system of claim 1, wherein:
   recirculating the one or more electrical currents comprises at least one of the high voltage battery modules providing the one or more electrical currents to the DC/DC converters and the one or more of the high voltage battery modules receiving the one or more electrical currents from the DC/DC converters; and
   the control system is configured to cause the DC/DC converters to output a value of the electrical currents that is adjusted based at least in part on thermal outlook of the DC/DC converters.

8. A method comprising:
   coupling a control system to direct current to direct current (DC/DC) converters, the DC/DC converters being configured to receive electrical currents from high voltage battery modules and output regulating electrical currents to a low voltage battery; and
   controlling, by the control system, the DC/DC converters to recirculate one or more of the electrical currents back to one or more of the high voltage battery modules in order to balance states of charge in the high voltage battery modules, wherein the control system is configured to control the DC/DC converters to recirculate the one or more of the electrical currents back to the one or more of the high voltage battery modules using a model predictive control, the control being configured to decouple the output regulating electrical currents to the low voltage battery from the balancing states of charge in the high voltage battery modules by controlling such that a sum of recirculating the one or more electrical currents is zero without interfering with a value of the regulating electrical currents to the low voltage battery.

9. The method of claim 8, wherein the control system is configured to cause the DC/DC converters to output a value of zero for the regulating electrical currents in response to no load current.

10. The method of claim 8, wherein the model predictive control
    provides a set of individual balancing currents balancing the states of charge for the high voltage battery modules, with each individual balancing current in the set of balancing currents corresponding to one of the high voltage battery modules;
    combines the set of individual balancing currents into a final current command using a real-time combiner, and forces at least one of, and less than all of, the individual balancing currents to have a negative value.

11. The method of claim 8, wherein the control system is configured to cause the DC/DC converters to output a value of zero for the regulating electrical currents by recirculating the one or more of the electrical currents back to the one or more of the high voltage battery modules.

12. The method of claim 8, wherein the control system is configured to determine that the one or more of the high voltage battery modules has a lower state of charge than another one or more of the high voltage battery modules.

13. The method of claim 12, wherein, in response to determining that the one or more of the high voltage battery modules has the lower state of charge than another one or more of the high voltage battery modules, the control system is configured to recirculate the one or more of the electrical currents from the another one or more of the high voltage battery modules back to the one or more of the high voltage battery modules having the lower state of charge.

14. The method of claim 8, wherein:
recirculating the one or more electrical currents comprises at least one of the high voltage battery modules providing the one or more electrical currents to the DC/DC converters and the one or more of the high voltage battery modules receiving the one or more electrical currents from the DC/DC converters; and
the control system is configured to cause the DC/DC converters to output a value of the electrical currents that is adjusted based at least in part on thermal outlook of the DC/DC converters.

15. A vehicle system comprising:
a memory having computer readable instructions; and
a processing device for executing the computer readable instructions, the computer readable instructions controlling the processing device to perform a method including:
controlling direct current to direct current (DC/DC) converters, such that the DC/DC converters are configured to receive electrical currents from high voltage battery modules and output regulating electrical currents to a low voltage battery; and
controlling the DC/DC converters to recirculate one or more of the electrical currents back to one or more of the high voltage battery modules in order to balance states of charge in the high voltage battery modules using a model predictive control; and
wherein the model predictive control is being configured to decouple output regulating electrical currents to the low voltage battery from the balancing states of charge in the high voltage battery modules such that a sum of recirculating the one or more electrical currents is zero without interfering with a value of the regulating electrical currents to the low voltage battery.

16. The vehicle system of claim 15, wherein the model predictive control
provides a set of individual balancing currents balancing the states of charge for the high voltage battery modules, with each individual balancing current in the set of balancing currents corresponding to one of the high voltage battery modules;
combines the set of individual balancing currents into a final current command using a real-time combiner, and
forces at least one of, and less than all of, the individual balancing currents to have a negative value.

17. The vehicle system of claim 15, wherein the processing device is configured to cause the DC/DC converters to recirculate the one or more of the electrical currents back to the one or more of the high voltage battery modules such that a sum of recirculating the one or more electrical currents is zero without interfering with a value of the regulating electrical currents to the low voltage battery.

18. The vehicle system of claim 15, wherein the processing device is configured to cause the DC/DC converters to output a value of zero for the regulating electrical currents by recirculating the one or more of the electrical currents back to the one or more of the high voltage battery modules.

19. The vehicle system of claim 15, wherein the processing device is configured to determine that the one or more of the high voltage battery modules has a lower state of charge than another one or more of the high voltage battery modules.

20. The vehicle system of claim 19, wherein, in response to determining that the one or more of the high voltage battery modules has the lower state of charge than another one or more of the high voltage battery modules, the processing device is configured to recirculate the one or more of the electrical currents from the another one or more of the high voltage battery modules back to the one or more of the high voltage battery modules having the lower state of charge.

* * * * *